United States Patent [19]
Braasch et al.

[11] Patent Number: 5,963,330
[45] Date of Patent: Oct. 5, 1999

[54] OPTICAL POSITION MEASURING DEVICE

[75] Inventors: Jan Braasch, Altenmarkt; Christian Callimici, Miesbach; Michael Allgäuer, Stein/Traun, all of Germany

[73] Assignee: Dr. Johannes Heidenhain GmbH, Germany

[21] Appl. No.: 08/842,065

[22] Filed: Apr. 24, 1997

[51] Int. Cl.⁶ .................................................. G01B 11/00
[52] U.S. Cl. ....................................... 356/373; 250/237 G
[58] Field of Search ................................... 356/373, 375; 250/231.13, 231.14, 231.15, 237 G

[56] References Cited

U.S. PATENT DOCUMENTS

5,324,934  6/1994  Clark .................................. 250/231.13

*Primary Examiner*—F. L. Evans
*Attorney, Agent, or Firm*—Brinks Hofer Gilson & Lione

[57] ABSTRACT

An optical position measuring device, in particular for a drive for precise positioning, is recited, which comprises two drive units which are movable in respect to each other, wherein one of the two drive units has a graduation as an integral component. The latter can be scanned by a scanning unit connected with the other drive unit for generating position-dependent output signals. The graduation is directly or indirectly disposed on a level surface of the drive unit, from which a distance between the two drive units is created in such a way that by the cooperation of the two drive units the generation of a defined relative movement between the two drive units is possible.

30 Claims, 5 Drawing Sheets

OPTICAL POSITION MEASURING DEVICE

The instant invention relates to an optical position measuring device, which, in particular, can be used in connection with drives for precise positioning.

Linear motors of different types are often employed as drives in connection with the production of semiconductors. If in this case it is intended to position a component not only in one dimension, but also on a plane, defined requirements are made on the measuring systems used as a result, by means of which the respective displacements in the different coordinate directions are detected. Besides a detection of displacement movements in two coordinate directions, there is often a requirement for detecting rotating movements around defined axes of the components to be positioned.

For example, in this connection it is known from U.S. Pat. No. 4,654,571 to provide a separate interferometer for each displacement axis. Besides problems regarding a limited measuring range, shading of the measurement beam paths, etc., a relatively large outlay in particular results because of the presently high costs per interferometer.

Besides this, there are attempts to use the customary periodic structure of the stator unit of the linear motors used in this connection for measuring purposes, besides the generation of the driving motion. Depending on the design of the linear motor used, these structures can be two-dimensionally arranged, tooth-like moving iron structures or periodically arranged permanent magnets of different or like polarity. For example, it is known to scan these structures with the aid of magnetic field-sensitive elements or appropriate coil arrangements in order to generate scanning signals modulated as a function of displacements. The periodic structures employed for generating the driving motion in this case have minimum graduation periods on the order of magnitude of 1 mm. In case of a hundredfold interpolation of the resultant scanning signals, a maximally achievable resolution of approximately 10 $\mu$m results which sometimes is not sufficient for precision applications.

To increase the measuring accuracy or respectively the resolution, the arrangement of a known graduated glass foundation with a graduation applied thereto between the movable drive elements suggests itself, for example to integrate a commercial cross grating in such a drive. One or several suitable scanning units are arranged on the drive unit, which can be moved relative to the cross grating graduation, by means of which optical scanning of the graduation and a corresponding determination of the position, including angles of rotation of interest, can take place in a known manner. It would be possible in principle to achieve a resolution in this way, which would also be sufficient for precision applications. In the case of stepper motors with periodic moving iron structures, however, the forward movement force which can be attained appreciably depends on the distance between the stator and the movable drive unit. If a defined distance between the two drive units, which are movable in respect to each other, is exceeded, the generation of a driving movement is no longer possible. This is the case when the mentioned graduated glass foundation of a commercial cross grating measuring system of a thickness of a few millimeters is disposed between the two movable units of the stepper motor.

It is therefore the object of the present invention to provide an optical position measuring device, by means of which an extremely accurate determination of the relative position of different elements is possible, in particular in connection with drives for the high-precision position of these elements. The mode of operation of the respective type of drive is not to be affected here by the additional position measuring device. Furthermore, the simplest possible design of such a position measuring device is required.

This object is attained by an optical position measuring device according to the present invention.

Advantageous embodiments of the optical position measuring device in accordance with the invention will be described hereinafter.

Because of the design of the graduation as an integral component of one of the two drive units which can be moved in relation to each other, it is now assured that the distance between the two drive units can be selected in such a way that the cooperation of the two drive units to generate a defined relative movement is possible. With this the functioning of stepper motors, which operate relatively sensitive to distance, is also assured. It is possible, for example, to equip stepper motors containing moving iron stators with the optical position measuring device in accordance with the invention without hindering their operation. At the same time the desired high resolution during position determination is assured when optical graduations with graduation periods in the $\mu$m-range are used.

Regarding the design of the drive unit with the associated graduation, there are various options in accordance with the invention. For example, the graduation can be arranged directly on a surface of a drive stator unit or partial areas thereof, which have been leveled. It is alternatively also possible to apply the graduation to a graduation foundation which, in turn, is arranged on the surface of a drive stator unit which has been leveled. A number of different embodiment variants are recited hereinafter.

In this case the optical position measuring device in accordance with the invention can be used for the measurement of one-dimensional displacement movements, as well as for determining displacement movements and/or turning movements in connection with positioning tasks in a plane. In the last mentioned case in particular, the provision of air bearings between the two drive units arranged movably in respect to each other has been shown as an advantageous step, so that frictionless positioning is possible.

An advantageous embodiment results when several drive stator units, designed in accordance with the invention, are arranged directly next to each other, and scanning is performed by means of two separate scanning units arranged on a common carriage. Such an embodiment of the position measuring device in accordance with the invention has been shown to be advantageous in that it is also possible to detect greater displacement movements with them, and at the same time only the manufacture of relatively compact drive stator units is necessary.

Further advantages and details of the optical position measuring device in accordance with the invention ensue from the following description of exemplary embodiments by means of the attached drawings.

Shown are in:

FIG. 1b, a lateral sectional view of the positioning measuring device in accordance with the invention of FIG. 1a;

Figure 1A:
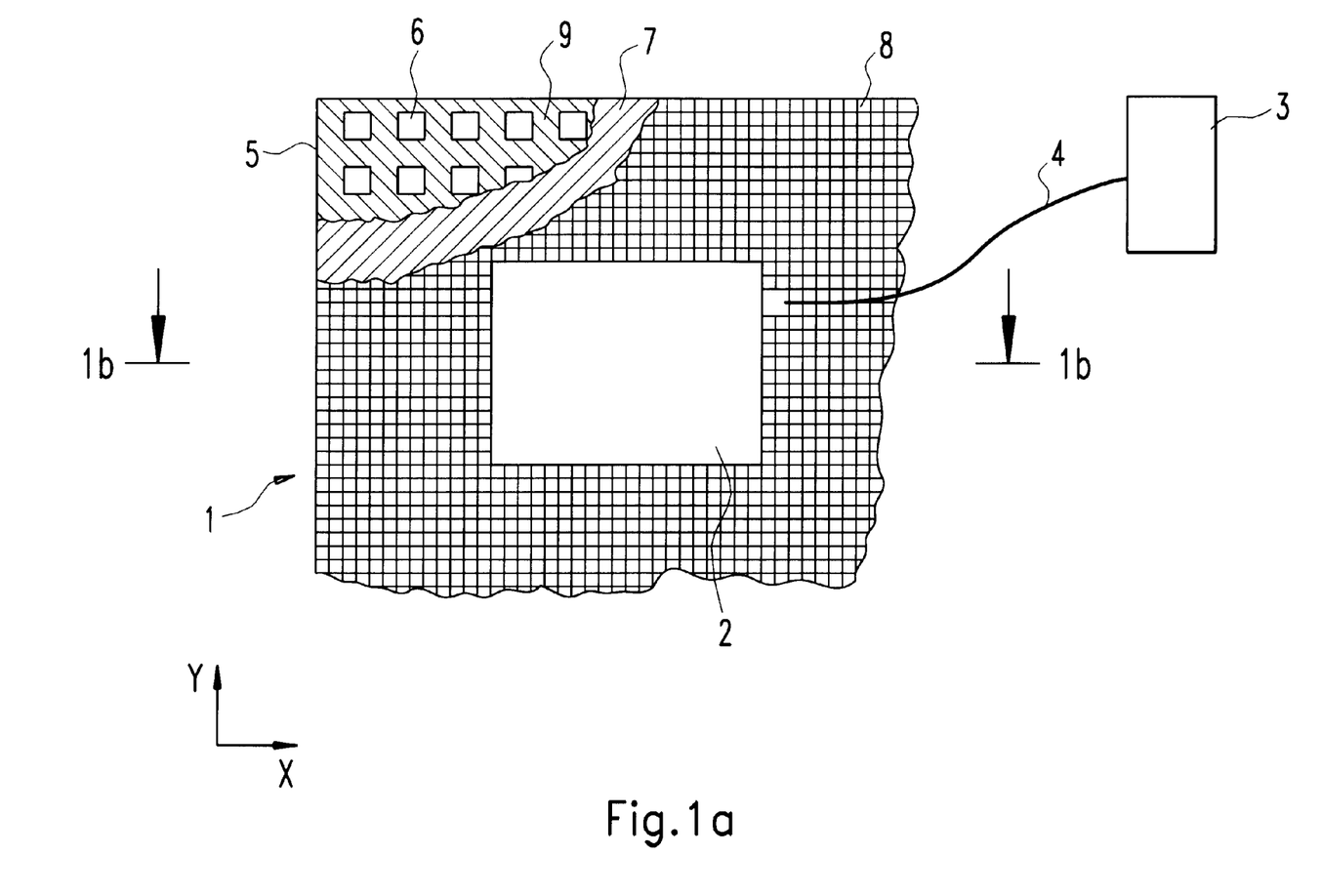
FIG. 1a, a top view of a portion of a first, schematically represented embodiment of the optical positioning measuring device in accordance with the invention.
Figure 1B:
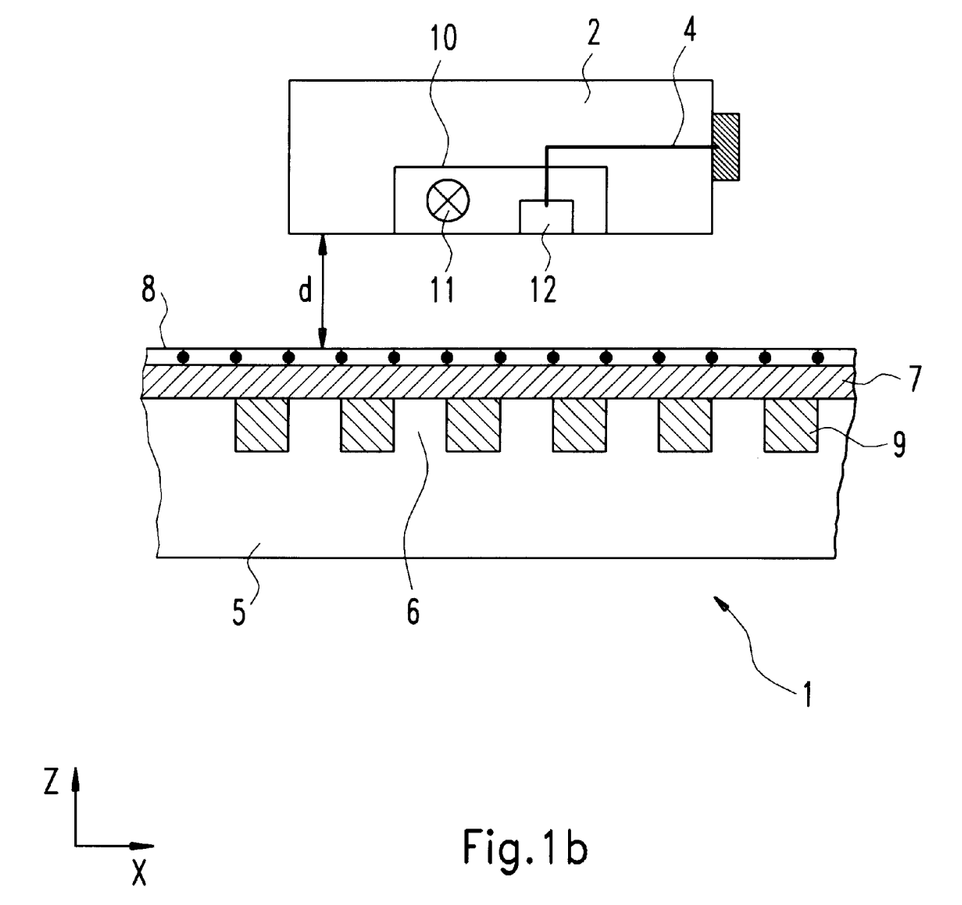

A first embodiment of the optical positioning measuring device in accordance with the invention is partially shown in a schematic representation in a top view in FIG. 1a. FIG. 1b shows a lateral sectional representation of this first exemplary embodiment along the section line drawn i FIG. 1a.

In this case the exemplary embodiment of the optical positioning measuring device in accordance with the invention is shown in connection with a drive, which can be used for the precise positioning of components, which can be moved in relation to each other in a plane, for example in the manufacture of semiconductors. Here the drive is embodied as a stepper motor, which comprises a stationary drive unit, i.e. a drive stator unit 1, and a drive unit 2 which is movable in relation to it. In an advantageous embodiment, the movable drive unit 2 is seated free of friction on the drive stator unit 1 by means of suitable air bearings. In this exemplary embodiment, the drive stator unit 1 is designed as a moving iron stator, which has spatially structured areas with cube-shaped rises 6 disposed on a base body 5 and recesses 9 located between them. For generating the drive motion, the movable drive unit 2 has several—not represented—exciter coils, which are triggered in the known manner, i.e. the stepped positioning of the movable drive element 2 in the xy-plane is possible by the chronologically defined excitation of the exciter coils. To this end the movable drive unit 2 is connected via a connecting line 4 with a suitably designed control and evaluation unit 3.

For the desired high-resolution position determination of the movable drive element 2 in the xy-plane, an optical position measuring device is provided in the exemplary embodiment, by means of which displacement-dependent scanning signals are generated by means of a vertical light arrangement. In the process, a graduation 8 assigned to the drive stator unit 1 is scanned by one or several scanning units 10 designed in a known manner and arranged on the side of the movable drive unit 2. Only a single scanning unit 10 can be seen on the side of the movable drive unit 2 in the representations of FIGS. 1a and 1b; however, for the complete detection of the movement in the xy-plane, including the determination of the angle $\phi$, on which the movable scanning unit 2 can be turned around a vertical axis, it is necessary to provide three such scanning units.

For this purpose the respective scanning units 10 comprise a light source 11 as well as at least one opto-electronic detector element 12, which detects the radiation reflected back from the graduation 8. A plurality of known possibilities exists regarding the design of the scanning unit 10, such as to additionally provide suitable optical transmission devices, scanning gratings, several suitably wired detector element, etc.

In the represented case of the two-dimensional movement of the movable drive unit 2, the graduation 8 scanned by reflection or in vertical light is embodied as a cross grating, which is scanned in a known manner for obtaining incremental position information. As already mentioned, in the case of optical scanning the graduation periods of the graduation 8 are clearly smaller than the periodicities of the cube-shaped rises 6 which can be scanned, for example by other scanning principles, for obtaining the position information. Meaningful graduation periods of the cross grating graduation 8 lie in the range of 1 . . . 100 $\mu$m. In the case of a hundertfold interpolation of the resultant scanning signals, a possible resolution during the position determination of 0.01 . . . 1 $\mu$m thus results.

The embodiment of the optical position measuring device in accordance with the invention subsequently described in detail is of course not limited to the represented case of movement in two dimensions, i.e. it is analogously possible to equip a linear stepper motor with it, which only makes possible positioning in one dimension. In this case it is for example possible to omit the air bearing arrangement mentioned, and separate guides of the movable drive element can be provided. A known one-dimensional, reflecting incremental graduation with an arrangement of graduation structures, which is periodic in the measuring direction, would have to be provided in this case.

To assure the functioning of the stepper motor also in connection with the desired position determination, it is now provided in accordance with the invention in the exemplary embodiment represented to embody the graduation foundation 7, including the graduation 8 arranged on it, as an integral component of the drive stator unit 1. To this end the recesses 9 located between the rises 6 of the stator drive unit 1 are provided with a filler material, so that a level surface of the drive stator unit 1 results. Regarding the filler material for the recesses 9 used, certain requirements have to be taken into consideration. First the filler material must be non-magnetic, in order to not affect the functioning of the stepper motor if possible. Furthermore, the filler material used should assure the production of as level as possible a surface of the drive stator unit 1 and should not swell, if possible. In addition, the possible best adhesion of layers possibly applied to it should be assured. It is furthermore advantageous if the filler material used has a thermal expansion coefficient similar to that of the surrounding material of the drive stator unit 1. Under these requirements, a hard solder, for example, has been shown to be a suitable filler material. Alternatively, filling with another, non-magnetic material or a plastic can also take place.

After filling the recesses 9 with a suitable filler, polishing of the surface of this drive unit can take place in a subsequent processing step, depending on the requirements made on planarity. In the exemplary embodiment represented, a thin layer used as the graduation foundation 7 is thereafter applied to the as level as possible surface of the drive stator unit 1. The material of the graduation foundation can be so-called spin-on glass or so-called sol-gel materials, which are applied in a known manner. The thickness of the layer used as graduation foundation 7 in this case is a few nm.

The actual graduation 8 is subsequently applied to the graduation foundation 7 or respectively the graduation foundation 7 is structured. In the case of a graduation 8 scanned in vertical light, a periodic structure with reflecting areas made of TiN and non-reflecting areas of $TiO_2$, for example, is suitable for this. The actual structuring of the different areas can in this case take place by means of known photo-lithographic techniques, for example.

Finally, it is also alternatively possible to embody the graduation foundation as a thin metal foil, which can be structured in a known manner, i.e. by means of the techniques known, for example, for producing steel measuring tape. In this connection the use of lasers, etc., is for example also possible for structuring. The metal foil inclusive of the graduation structure arranged on it can then be glued to the surface of the drive stator unit.

In contrast to the mere arrangement of a glass plate of a commercial cross grating measuring system on the surface of the drive stator unit 1, it is possible to assure by means of the steps in accordance with the invention that the distance d between the periodic structures of the one drive element 1 and the exciter coils of the other, movable drive element 2, does not become too great, so that a drive movement can possibly no longer be generated. The layers with the graduation foundation 7 and the graduation 9 arranged on the level surface of the drive stator unit 1 all together have a thickness of an order of magnitude of a few nm. By means of this it is assured that in the exemplary embodiment described, the cooperation between the drive stator element 1 and the drive unit 2, which is movable in relation with it, continues to be possible and that a defined relative movement between the two drive units 1, 2 can be generated in this way.

Alternatively with the described variant with the period structure on the side of drive unit on the stator side, it is of course possible in the same way to use the drive unit with the period structure as the movable drive unit. In this case the graduation foundation inclusive of the graduation is associated with the movable drive unit in the same way as explained above.

Figure 2:
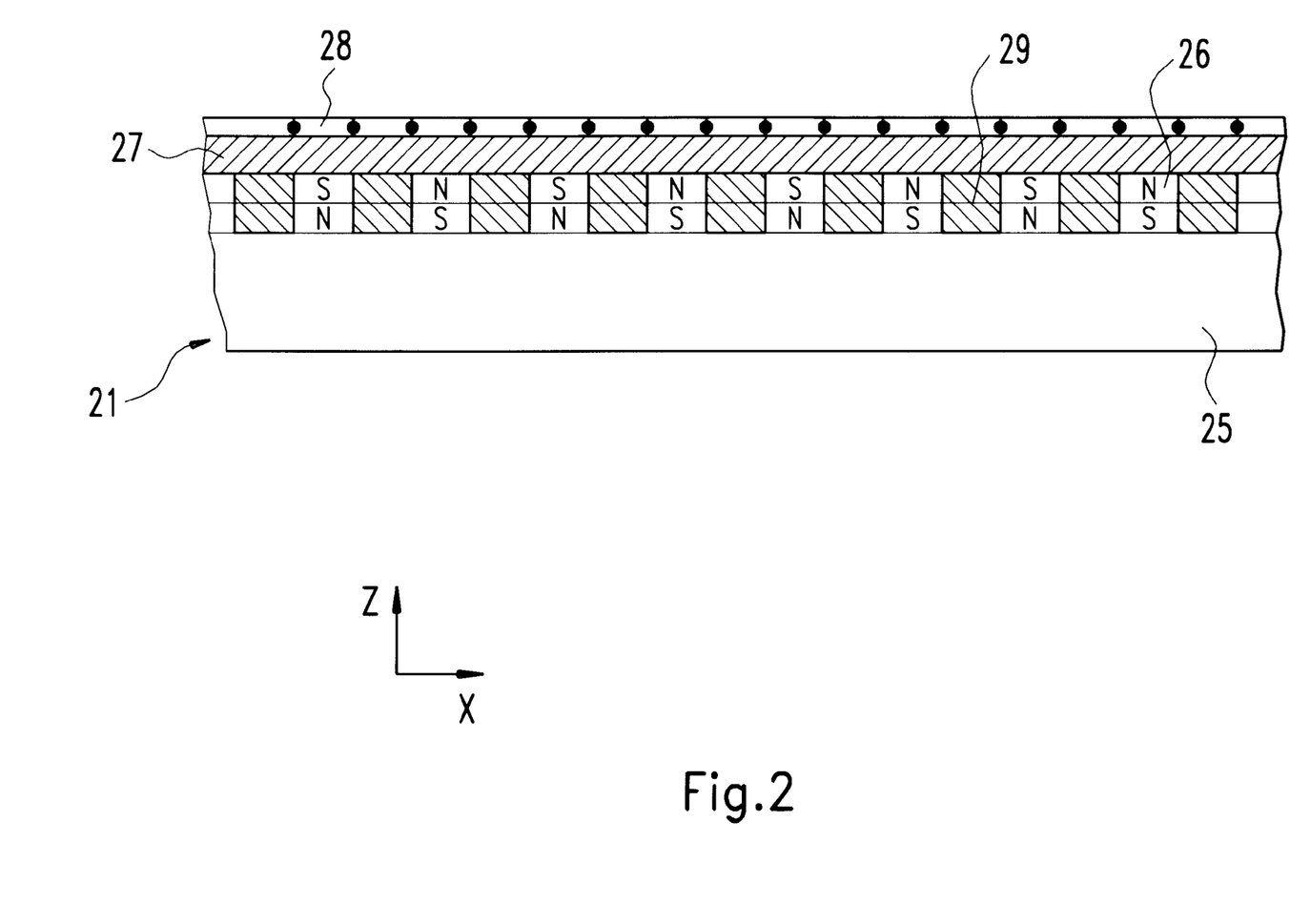
FIG. 2, a lateral sectional view of a second, schematically represented embodiment of a drive stator unit of the optical positioning measuring device in accordance with the invention.

A second embodiment of a drive stator unit 21, which can be employed in the optical position measuring device in accordance with the invention, is represented schematically in FIG. 2. In contrast to the described first exemplary embodiment, a different periodic structure on the side of the drive stator unit 21 is provided, which can be employed in a permanent magnet linear motor. Thus, on a base body 25 of the drive stator unit 21, cube-shaped permanent magnets 26 are arranged in a periodic pattern analogously with the first exemplary embodiment, wherein an arrangement with different polarities of the adjoining permanent magnets 26 is provided in FIG. 2. Alternatively, these permanent magnets can also all be aligned with the respectively same orientation. The generation of the drive motion of a—not represented—drive unit which can be moved relatively to this takes place in the known way by the appropriate triggering of exciter coils in the respectively other drive unit.

As in the first exemplary embodiment, it is again provided to fill the recesses 29 between the permanent magnets 26 with a filler material, so that a level surface of this drive unit 21 results. A layer used as graduation foundation 27 is subsequently applied to a surface leveled in this way, on which the graduations 28 are arranged in turn. Reference is made to the above remarks regarding the possible design of the graduation foundation 27, the graduation 28, as well as the demands made on the filler material.

Figure 3A:
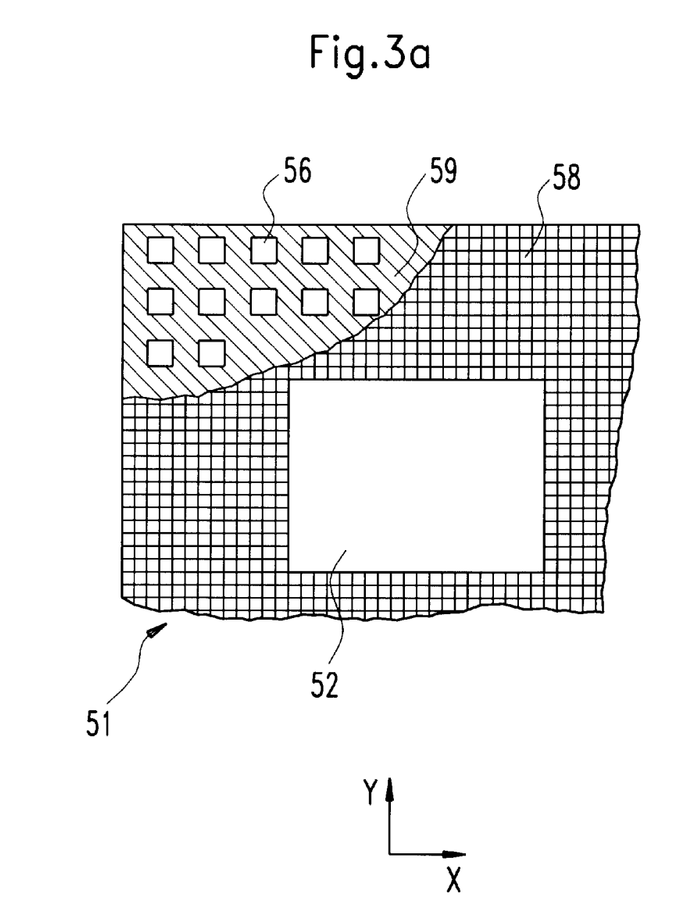
FIGS. 3a and 3b, two views of a third embodiment of a drive stator unit of the optical positioning measuring device in accordance with the invention.
Figure 3B:
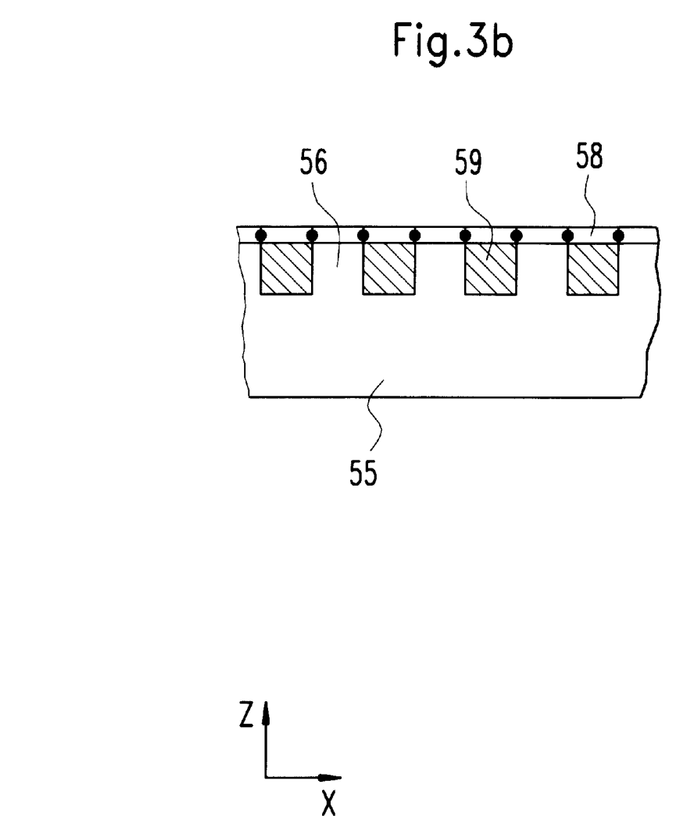
Figure 4:
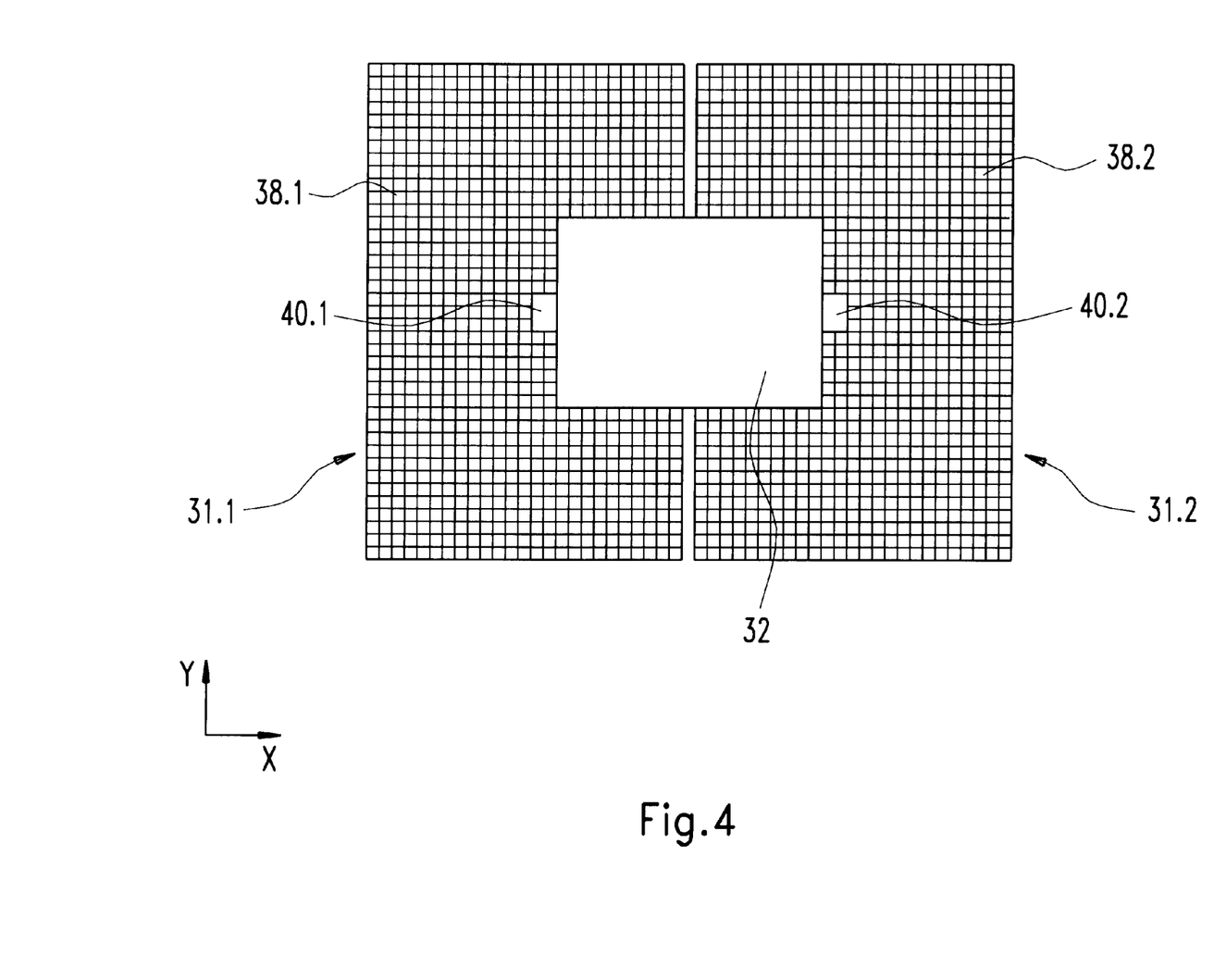
FIG. 4, a further variant of the positioning measuring device in accordance with the invention with two touching stationary drive units.

A further embodiment of the optical position measuring device in accordance with the invention is schematically represented in two partial views in FIGS. 3a and 3b. Again, the graduation 58 is assigned to the stationary drive unit 51 which, analogously with the first exemplary embodiment, has a periodic structure with rises 56 and recesses 59 between them on a base body 55, i.e. is designed as a moving iron stator. Not shown is the movable drive unit, which is arranged above the drive stator unit 51, with the exciter coils as well as one or several scanning units which are used for the vertical light scanning of the graduation 58 on the drive stator unit 51. In contrast to the two embodiments previously explained, it is now provided to arrange the graduation 58 embodied as a cross grating as an integral component of the stationary drive unit 1 directly on the level or respectively leveled surface thereof, i.e. to omit a separate graduation foundation. Leveling of the appropriate surface takes place as previously explained, i.e. by filling the recesses 56 with a suitable filler material, for example hard solder. The surface is then subsequently polished before the actual structuring takes place for applying the graduation 58. In this case the graduation 58 can again consist of periodically arranged, reflecting and non-reflecting areas made of, for example, TiN/TiO$_2$, etc.

Depending on the measuring requirements, the graduation can also be applied alternatively to the represented variant only in partial areas of the level surface, for example only on the surfaces of the rises, etc.

A special, advantageous embodiment of the optical position measuring device is represented schematically in FIG. 3. Here, two separate drive stator units 31.1, 31.2 are represented, which are arranged next to each other. The design of the two drive stator units 31.1, 31.2 corresponds to that in the first described exemplary embodiment in FIGS. 1a and 1b, i.e. respectively as an integral part of the drive stator units 31.1, 31.2, a cross grating is disposed on the top of the latter as a graduation 39.1, 38.2. The movable drive unit 32 is provided above the two drive stator units 31.1, 31.2, which can be positioned via air bearings in the xy-plane. Among other things, the movable drive unit 32 comprises two scanning units 40.1, 40.2, which are arranged on the two transverse sides of the drive unit 32 and by means of which optical scanning of the cross grating graduations takes place. Besides the determination of the amounts of displacement in the xy-plane, it is also possible by means of the represented arrangement to detect a rotation of the movable drive unit 32 around a vertical axis oriented in the z-direction.

By means of this exemplary embodiment it is intended to illustrate that on the basis of the instant invention large displacement areas of movable drive units can be realized with such drives, and at the same time the high-resolution optical position determination is possible.

To this end several smaller drive stator units, all of which are designed in the described way, can be aligned with each other. It is therefore not necessary to produce a single, large-surface drive stator unit, instead, a defined stator size can be employed which, as a function of the required displacement area, can be correspondingly often lined up next to each other.

Thus, a number of embodiment options result on the basis of the considerations in accordance with the invention, which all assure a dependable, high-resolution optical position measurement in connection with the different stepper motor variants.

We claim:

1. An optical position measuring device for a drive for precise positioning, comprising:

a first drive unit and a second drive unit which are movable in respect to each other, wherein the first drive unit comprises a graduation as an integral part, which can be scanned by a scanning unit connected with the second drive unit for generating position-dependent output signals, and the graduation is directly or indirectly arranged on a level surface of the first drive unit, from which a distance (d) results between the first and second drive units in such a way that by a cooperation of the first and second drive units the generation of a defined relative movement between the first and second drive units is possible; and wherein the graduation is disposed on a layer on the level surface, used as the graduation foundation of the first drive unit, and the thickness of the layer used as the graduation foundation, inclusive of the graduation, has been selected such, that a cooperation of the first drive unit with the second drive unit, which is movable in relation to the first drive unit, is possible.

2. The optical position measuring device in accordance with claim 1, wherein spin-on glass has been selected as the material of the graduation foundation.

3. The optical position measuring device in accordance with claim 1, wherein a sol-gel material has been selected as the material of the graduation foundation.

4. The optical position measuring device in accordance with claim 1, wherein the graduation foundation is embodied as a thin metal foil.

5. The optical position measuring device in accordance with claim 2, wherein the graduation applied to the graduation foundation comprises TiN/TiO$_2$ areas.

6. The optical position measuring device in accordance with claim 4, wherein the metal foil constituting the graduation foundation comprises reflecting and non-reflecting areas.

7. The optical position measuring device in accordance with claim 1, wherein the graduation is embodied as a one-dimensional incremental graduation.

8. The optical position measuring device in accordance with claim 1, wherein the graduation is embodied as a two-dimensional cross grating.

9. The optical position measuring device in accordance with claim 1, wherein the scanning unit comprises at least one light source as well as one or several opto-electronic detector elements.

10. The optical position measuring device in accordance with claim 1, further comprising a third drive unit which is movable in respect to the first and second drive units and has at least two spaced-apart scanning units which are respectively embodied for the optical scanning of the graduations disposed on the first drive unit.

11. An optical position measuring device for a drive for precise positioning, comprising:

a first drive unit and a second drive unit which are movable in respect to each other, wherein the first drive unit comprises a graduation as an integral part, which can be scanned by a scanning unit connected with the second drive unit for generating position-dependent output signals, and the graduation is directly or indirectly arranged on a level surface of the first drive unit, from which a distance (d) results between the first and second drive units in such a way that by a cooperation of the first and second drive units the generation of a defined relative movement between the first and second drive units is possible; and wherein the graduation is disposed, at least in partial areas, directly on the level surface of the first drive unit.

12. The optical position measuring device in accordance with claim 11, wherein the graduation is embodied as a one-dimensional incremental graduation.

13. The optical position measuring device in accordance with claim 11, wherein the graduation is embodied as a two-dimensional cross grating.

14. The optical position measuring device in accordance with claim 11, wherein the first drive unit has a periodic structure with rises and recesses between them and the recesses being filled with a filler material so that a leveled surface results onto which the graduation is directly arranged.

15. The optical position measuring device in accordance with claim 11, wherein the graduation comprises periodically arranged reflecting and non-reflecting areas.

16. The optical position measuring device in accordance with claim 11, wherein the graduation comprises periodically arranged areas of TiN and TiO$_2$.

17. The optical position measuring device in accordance with claim 3, wherein the graduation applied to the graduation foundation comprises TiN/TiO$_2$ areas.

18. An optical position measuring device for a drive for precise positioning, comprising:

a first drive unit and a second drive unit which are movable in respect to each other, wherein the first drive unit comprises a graduation as an integral part, which can be scanned by a scanning unit connected with the second drive unit for generating position-dependent output signals, and the graduation is directly or indirectly arranged on a level surface of the first drive unit, from which a distance (d) results between the first and second drive units in such a way that by a cooperation of the first and second drive units the generation of a defined relative movement between the first and second drive units is possible;

wherein the graduation is disposed on a layer on the level surface, used as the graduation foundation of the first drive unit, and the thickness of the layer used as the graduation foundation, inclusive of the graduation, has been selected such, that a cooperation of the first drive unit with the second drive unit, which is movable in relation to the first drive unit, is possible; and wherein the graduation foundation and the graduation are associated with a drive stator unit, which comprises spatially structured areas with rises and recesses between them, which are periodically arranged in one or two dimensions.

19. The optical position measuring device in accordance with claim 18, wherein the recesses in the drive stator unit are provided with a filler material.

20. The optical position measuring device in accordance with claim 19, wherein the filler material has a thermal expansion coefficient similar to that of the surrounding material of the drive stator unit.

21. The optical position measuring device in accordance with claim 20, wherein hard solder is disposed as the filler material in the recesses.

22. The optical position measuring device in accordance with claim 18, wherein the graduation is embodied as a one-dimensional incremental graduation.

23. The optical position measuring device in accordance with claim 18, wherein the graduation is embodied as a two-dimensional cross grating.

24. The optical position measuring device in accordance with claim 18, wherein the scanning unit comprises at least one light source as well as one or several opto-electronic detector elements.

25. The optical position measuring device in accordance with claim 18, further comprising a third drive unit which is movable in respect to the first and second drive units and has at least two spaced-apart scanning units which are respectively embodied for the optical scanning of the graduations disposed on the first drive unit.

26. An optical position measuring device for a drive for precise positioning, comprising:

a first drive unit and a second drive unit which are movable in respect to each other, wherein the first drive unit comprises a graduation as an integral part, which can be scanned by a scanning unit connected with the second drive unit for generating position-dependent output signals, and the graduation is directly or indirectly arranged on a level surface of the first drive unit, from which a distance (d) results between the first and second drive units in such a way that by a cooperation of the first and second drive units the generation of a defined relative movement between the first and second drive units is possible;

wherein the graduation is disposed on a layer on the level surface, used as the graduation foundation of the first drive unit, and the thickness of the layer used as the graduation foundation, inclusive of the graduation, has been selected such, that a cooperation of the first drive unit with the second drive unit, which is movable in relation to the first drive unit, is possible; and wherein the graduation foundation and the graduation are associated with a drive stator unit which comprises areas of a defined magnetization pattern, which is periodically arranged in one or two dimensions.

27. The optical position measuring device in accordance with claim 26, wherein the graduation is embodied as a one-dimensional incremental graduation.

28. The optical position measuring device in accordance with claim 26, wherein the graduation is embodied as a two-dimensional cross grating.

29. The optical position measuring device in accordance with claim 26, wherein the scanning unit comprises at least one light source as well as one or several opto-electronic detector elements.

30. The optical position measuring device in accordance with claim 26, further comprising a third drive unit which is movable in respect to the first and second drive units and has at least two spaced-apart scanning units which are respectively embodied for the optical scanning of the graduations disposed on the first drive unit.

* * * * *

UNITED STATES PATENT AND TRADEMARK OFFICE
CERTIFICATE OF CORRECTION

PATENT NO. : 5,963,330
DATED : October 5, 1999
INVENTOR(S) : Jan Braasch et al.

It is certified that error appears in the above-identified patent and that said Letters Patent is hereby corrected as shown below:

Title page,
After item [22], insert new item as follows:

--     Foreign Application Priority Data

DE 19646771.3      11/1996      Fed. Rep. Of Germany --.

Before line 1, under "U.S. PATENT DOCUMENTS", insert the following:

| | | |
|---|---|---|
| -- 4,070,759 | 01/1978 | Nelle |
| 4,170,826 | 10/1979 | Holstein |
| 4,198,757 | 04/1980 | Nelle et al. |
| 4,276,696 | 07/1981 | Ernst |
| 4,479,304 | 10/1984 | Nelle |
| 4,492,032 | 01/1985 | Nelle |
| 4,495,700 | 01/1985 | Ernst |
| 4,530,157 | 07/1985 | Nelle |
| 4,530,159 | 07/1985 | Ernst |
| 4,573,000 | 02/1986 | Nelle |
| 4,654,571 | 03/1987 | Hinds |
| 4,667,096 | 05/1987 | Dangschat |
| 5,050,311 | 09/1991 | Nelle |
| 5,126,560 | 06/1992 | Kraus --. |

After line 1, under "U.S. PATENT DOCUMENTS", insert the following:

| | | |
|---|---|---|
| -- 5,334,892 | 08/1994 | Chitayat |
| 5,648,690 | 07/1997 | Hinds |
| 5,758,427 | 06/1998 | Feichting et al. --. |

After line 1, under "U.S. PATENT DOCUMENTS", insert the following:

--      FOREIGN PATENT DOCUMENTS
    EPO 0 423 533      04/1991      European Pat. Office
    EPO 0 425 937      05/1991      European Pat. Office --.

UNITED STATES PATENT AND TRADEMARK OFFICE
CERTIFICATE OF CORRECTION

PATENT NO.    : 5,963,330
DATED         : October 5, 1999
INVENTOR(S)   : Jan Braasch et al.

It is certified that error appears in the above-identified patent and that said Letters Patent is hereby corrected as shown below:

-- OTHER PUBLICATIONS

Patent Abstracts of Japan, vol. 12, no. 412 (E-676), October 31, 1988. Abstract regards Japanese publication no. 63 148855.

Patent Abstracts of Japan, vol. 6, no. 170 (E-128), September 3, 1982. Abstract regards Japanese publication no. 57 085570. --.

Signed and Sealed this

Fifteenth Day of January, 2002

Attest:

JAMES E. ROGAN
Director of the United States Patent and Trademark Office

Attesting Officer